United States Patent [19]

Wulf

[11] Patent Number: 5,495,331
[45] Date of Patent: Feb. 27, 1996

[54] DUAL-BEAM POLYCHROMATOR

[75] Inventor: Jürgen Wulf, Ueberlingen, Germany

[73] Assignee: Bodenseewerk Perkin-Elmer GmbH, Uberlingen, Germany

[21] Appl. No.: 391,397

[22] Filed: Feb. 27, 1995

[30] Foreign Application Priority Data

Mar. 23, 1994 [DE] Germany .......................... 44 10 036.1

[51] Int. Cl.$^6$ ..................................................... G01J 3/28
[52] U.S. Cl. ............................................................ 356/328
[58] Field of Search .................................... 356/305, 307, 356/326, 328, 330–334, 319

[56] References Cited

U.S. PATENT DOCUMENTS

| | | | |
|---|---|---|---|
| 4,575,243 | 3/1986 | Witte | 356/333 |
| 4,674,871 | 6/1987 | Shifrin | 356/328 |
| 4,678,917 | 4/1987 | Helms et al. | 250/373 |
| 4,786,174 | 11/1988 | Witte | 356/328 |
| 4,848,904 | 4/1989 | Sapp et al. | 356/319 |
| 5,305,082 | 4/1994 | Bret | 356/328 |

FOREIGN PATENT DOCUMENTS

| | | |
|---|---|---|
| 0427966 | 10/1990 | European Pat. Off. . |
| 2364436 | 4/1978 | France . |
| 2577314 | 4/1986 | France . |
| 2585468 | 1/1987 | France . |
| 293423 | of 1983 | Germany . |
| 3906930 | 9/1989 | Germany . |
| 4223211 | 1/1994 | Germany . |
| 4223212 | 1/1994 | Germany . |
| 5180762 | 6/1993 | Japan | 356/319 |
| 2110836 | 6/1983 | United Kingdom | 356/319 |

OTHER PUBLICATIONS

JP Patent Abstract of Japan: 56–37527 A., P–66, Jun. 16, 1981, vol. 5, No. 92.
JP Patent Abstracts of Japan 57–37233 A., P–122, Jun. 15, 1982, vol. 6, No. 104.

*Primary Examiner*—Vincent P. McGraw
*Assistant Examiner*—K. P. Hantis
*Attorney, Agent, or Firm*—Edwin T. Grimes

[57] ABSTRACT

The present invention refers to a dual-beam polychromator comprising a reflecting dispersion grating, a first entrance slit for a first ray bundle, a second entrance slit for a second ray bundle and first and second detector devices respectively used for simultaneously detecting the spectra of the first and second ray bundles diffracted at the dispersion grating. Dual-beam polychromators which are known according to the prior art and which have their respective entrance slits arranged directly adjacent the detector devices of the other channel cause substantial structural difficulties with regard to the mechanical provision of the respective components. In accordance with the present invention, this problem is solved by a dual-beam polychromator of the above-mentioned type, which is characterized by the features that a concave mirror means provided with an opening is located opposite the dispersion grating, said concave mirror means being adapted to be used for focussing the light, which has been diffracted at the dispersion grating, onto said first and second detector devices, and that each of the ray bundles coming from the first and second entrance slits are adapted to be directed through said opening onto the grating.

14 Claims, 4 Drawing Sheets

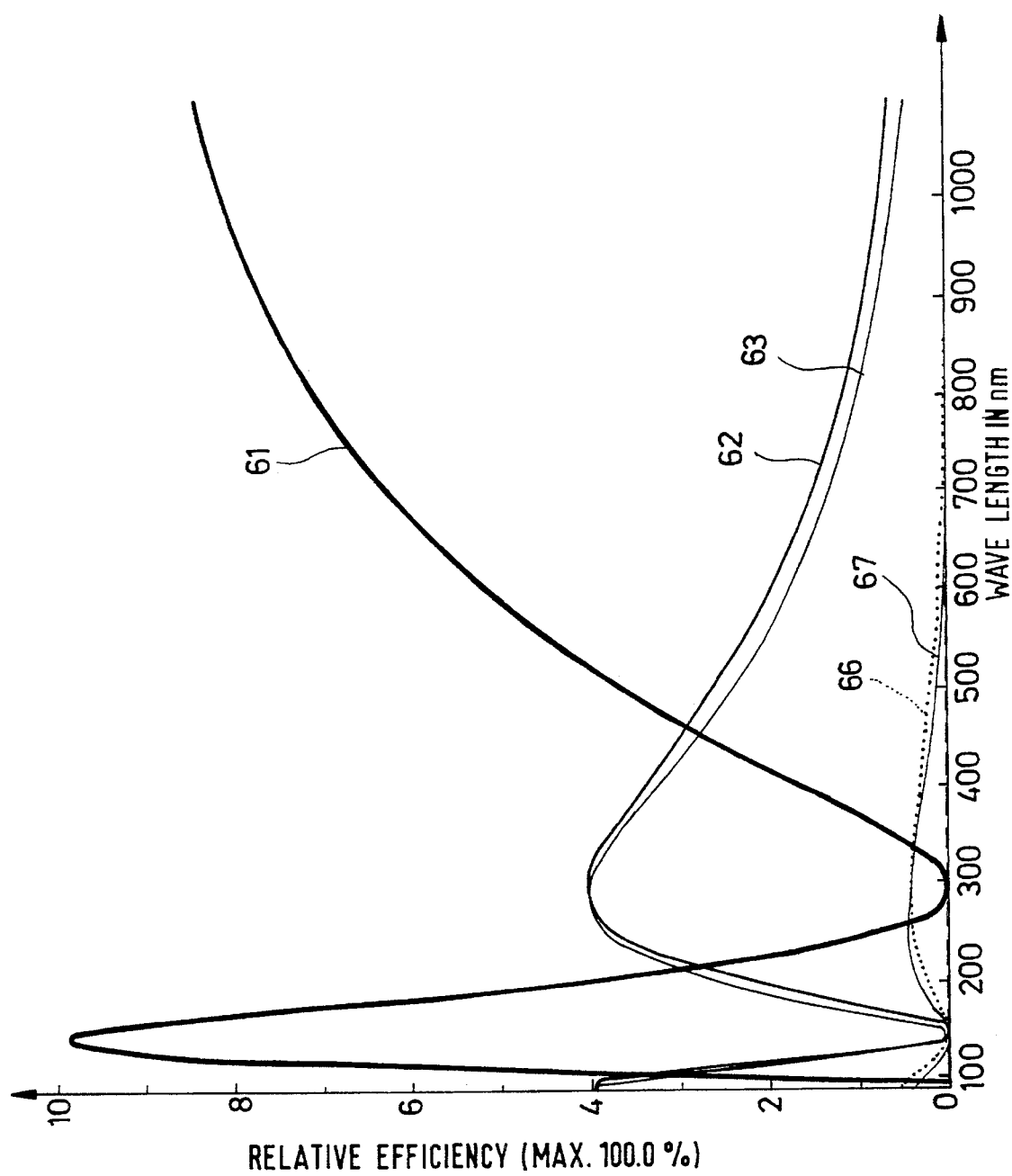

DUAL-BEAM POLYCHROMATOR

The present invention refers to a dual-beam polychromator comprising a reflecting dispersion grating, a first entrance slit for a first ray bundle, a second entrance slit for a second ray bundle and first and second detector devices respectively used for simultaneously detecting the spectra of the first and second ray bundles diffracted at the dispersion grating.

Polychromators permit a simultaneous detection of a spectrally spread (dispersed) light ray bundle and, consequently, they are very important in the field of spectroscopy. In a polychromator, a light ray bundle which has passed e.g. through an absorption specimen is normally directed via an entrance slit onto a dispersion grating for producing a spatially spread wavelength spectrum which is imaged in an image plane having a field of detectors arranged therein. By means of this field of detectors, e.g. in the form of a line of diodes, it is possible to simultaneously measure the intensities of the spectrally dispersed light falling onto each of the individual diodes.

For eliminating measurement errors, which may be caused e.g. by fluctuations or wavelength drifts in the light source or by drift phenomena resulting from thermal variations of the optical path in the polychromator, DE-A-42 23 211 describes a dual-beam grating polychromator having, in addition to the normal specimen ray bundle, a reference ray bundle travelling inversely symmetrical thereto so as to permit a reference measurement while said reference ray bundle passes along the same optical path as said specimen ray bundle but in the opposite direction; by means of this reference measurement, changes in the optical system can be detected simultaneously with the specimen measurement. In the known dual-beam grating polychromator, the specimen light emerging as divergent light from the entrance slit is reflected by a first concave mirror after having crossed an optical axis formed by the surface normal of the grating, whereupon it impinges on the grating as a parallel beam of light and is reflected and dispersed by said grating. The specimen light dispersed by the grating falls onto a second concave mirror which is arranged symmetrically with respect to the first concave mirror relative to the optical axis, said specimen light being reflected by said second concave mirror and falling then, after having again crossed the optical axis, onto a diode array permitting the simultaneous detection of the wavelength region for the specimen ray bundle. An entrance slit for a reference ray bundle is arranged subsequent to the diode array when seen in the longitudinal direction thereof at the position at which the zeroth order of the specimen ray bundle is imaged, the reference ray bundle travelling along an optical path which is inverse to the optical path of the specimen ray bundle and falling onto a second field of detectors arranged adjacent the entrance slit for the specimen ray bundle symmetrically with respect to said first field of detectors.

The system has the advantage that changes in the optical arrangement, which may, by way of example, concern hitherto non quantifiable deviations caused by thermal expansion within the polychromator, can reliably be eliminated by the reference measurement on the basis of the results for the specimen ray bundle. In the case of the known system, it is, however, difficult to arrange the second entrance slit and the second field of detectors for the reference ray bundle in a suitable manner, since the mechanical construction for the entrance slit and for he detector field of the specimen ray bundle are a hindrance. An attempt to avoid this problem was to arrange the entrance slits for the reference ray bundle and the specimen ray bundle at positions which are displaced relative to the adjacent detector devices and to fold the light emerging from the slits into the desired optical path via adequately deflecting, semisilvered mirrors. Such semisilvered mirrors, which are arranged in front of the detector devices, represent additional optical components which are difficult to mount and which, due to a wavelength-dependent and angle-dependent transmission characteristic, influence the intensity measurement at the detectors in a manner which is not easy to foresee.

Hence, it is the object of the present invention to provide an improved dual-beam polychromator which surmounts the above-mentioned difficulties according to the prior art.

In accordance with the present invention, this object is achieved by a dual-beam polychromator comprising a reflecting dispersion grating, a first entrance slit for a first ray bundle and a second entrance slit for a second ray bundle as well as first and second detector devices respectively used for simultaneously detecting the spectra of the first and second ray bundles diffracted at the dispersion grating, said dual-beam polychromator being characterized in that a concave mirror means provided with an opening is located opposite the dispersion grating, said concave mirror means being adapted to be used for focussing the light, which has been diffracted at the dispersion grating, onto said first and second detector devices, and that the light coming from the first and second entrance slits is adapted to be directed through said opening onto the dispersion grating.

The dual-beam polychromator according to the present invention provides a simplified mode of arrangement for the first and second entrance slits at a considerable distance from the respective detector devices, so that no collision between the mechanical arrangement of the entrance slits and that of the detector devices will occur. Hence, the two-beam polychromator offers the advantage that it has a simplified mechanical structure. The opening provided in the concave mirror additionally guarantees that flare light is effectively removed from the polychromator, since all the undesired light discharged through the opening will leave the arrangement completely and will therefore not cause any unwanted contribution to the signals on the detector devices. The present invention additionally has the advantage that only a single focussing concave mirror means is necessary for forming on the detector devices an image of the first and second ray bundles which have been diffracted at the grating. Hence, only one collimating optical arrangement is required in addition to the dispersion grating, whereby a comparatively simple structural design of the polychromator is obtained. Due to the small number of optical components required, the polychromator is particularly economy-priced. In addition, the amount of work required for adjusting the optical arrangement is reduced due to the small number of optical components. The dual-beam polychromator according to the present invention permits a very compact structural design.

In accordance with one advantageous further development, a concave grating is provided as a dispersion grating. Due to the concave grating, onto which the first and second ray bundles can be allowed to fall as divergent ray bundles, it is no longer necessary to provide any additional collecting optics for collimating the two ray bundles before they are dispersed at the grating.

In another advantageous further development, the dual-beam polychromator has first and second entrance slits which are arranged relative to the dispersion grating in such a way that the positive or the negative first order of diffraction of the first ray bundle and the respective inverse order of diffraction of the second ray bundle fall onto the first and second detector devices and that the respective other first orders of diffraction of the first and second ray bundles essentially leave the polychromator through the opening. Due to this arrangement of the entrance slits by means of which a desired angle of incidence of the respective ray bundles on the dispersion grating is achieved, the respective complementary, undesired orders of diffraction of the first and second ray bundles, which have a comparatively high diffraction intensity especially in the wavelength regions to which the detector devices respond, will leave the polychromator through the opening in the concave mirror means. It follows that a suppression of the respective undesired order of diffraction having a comparatively high intensity is achieved in a particularly simple but nevertheless extremely effective manner.

In accordance with an additional advantageous embodiment of the dual-beam polychromator, the first and second entrance slits and the first and second detector devices are located in a dispersion plane extending at right angles to the direction of the grating spaces. The dual-beam polychromator has, consequently, a particularly good resolution, since an optimum sharp image of the spectrum is obtained preferably for ray bundles extending in the dispersion plane.

In accordance with another advantageous embodiment, the dispersion grating used is a laminary grating, which comprises reflecting bars having an essentially rectangular cross-section, and grating spaces of identical width, and in the case of which a diffraction into even orders of diffraction such as the $+2^{nd}$ or $-2^{nd}$ order of diffraction is suppressed. It follows that the respective detector devices essentially detect only the light of precisely one desired order of diffraction.

In accordance with an additional advantageous embodiment, the detector devices each comprise a diode array. The use of diode arrays permits a simple and rapid electrooptical conversion of the spectrum into electrical signals which can easily be subjected to further processing, e.g. in a small computer. In this connection, it will be particularly advantageous to use for the first and second detector devices select diode arrays which show the same thermal and electrooptical behaviour. Such select diode arrays may, for example, be two diode arrays, which were produced in juxtaposition on a single substrate and which show a practically identical behaviour, since they were manufactured in common in the same manufacturing process and since they were detached from one another and installed in separate housings only after the end of the manufacturing process.

Further adavantageous embodiments are disclosed by the subclaims.

In the following, one embodiment of the present invention will be explained and described in detail with reference to the drawings, in which:

FIG. 4 shows a graphic representation of the diffraction efficiency as a function of the wavelength of the individual diffraction orders for a typical laminary grating shown in FIG. 3.

Figure 1:
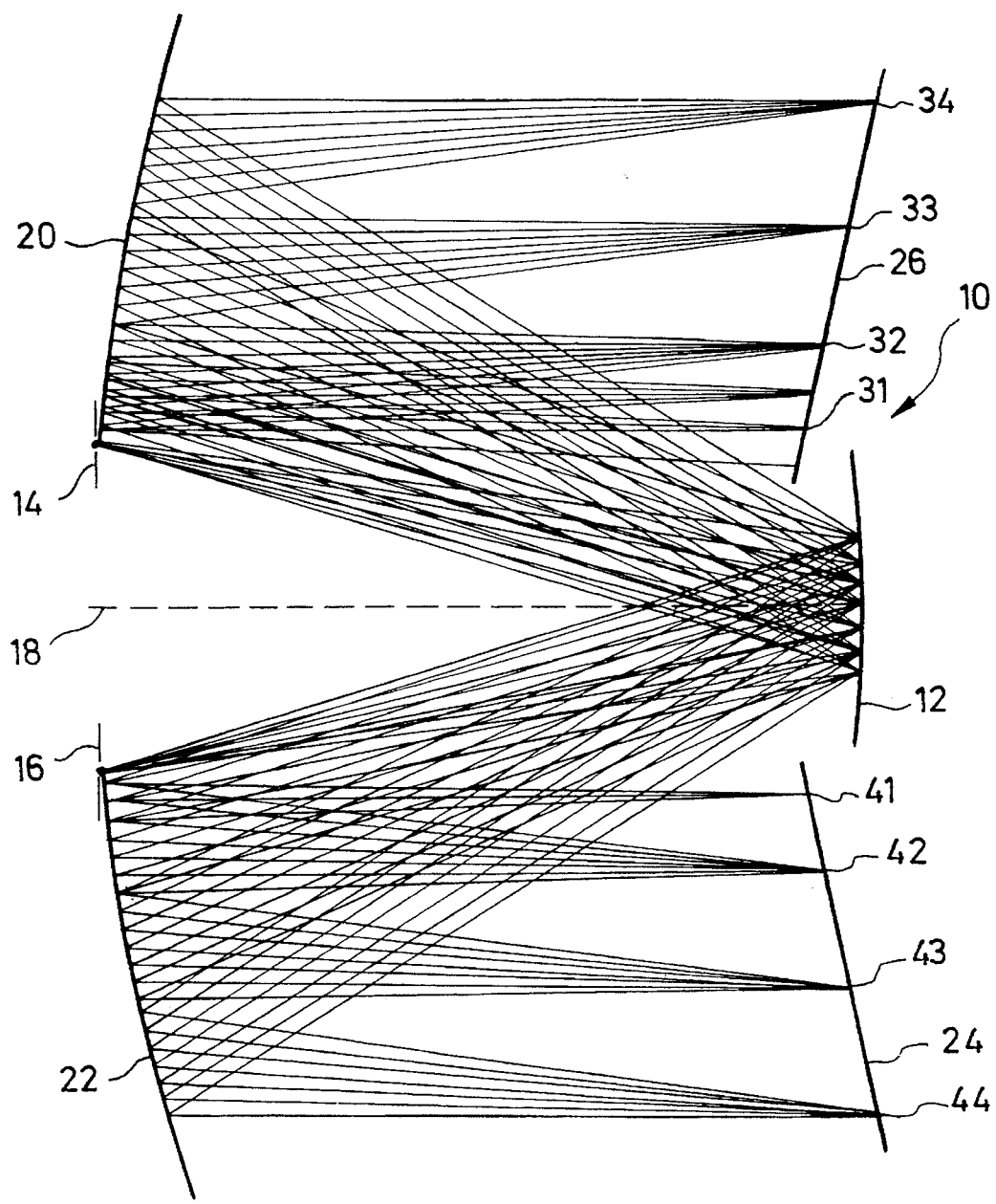
FIG. 1 shows a schematic sectional view of the optical design of the dual-beam polychromator according to the present invention in which the optical paths are shown.

A dual-beam polychromator 10, which is shown in a schematic sectional view in FIG. 1, comprises a concave grating 12 whose grating spaces extend at right angles to the plane of paper, said concave grating 12 being arranged at right angles to a symmetry axis or optical axis 18. A concave mirror means is arranged opposite said grating 12, said concave mirror means being subdivided by a central opening, which is arranged symmetrically relative to the optical axis 18, into a first subreflector 20 representing the upper reflector in the drawing and into a second subreflector 22 representing the lower reflector. The two submirrors 20 and 22 are preferably subareas of a single concave mirror, preferably of a toroidal mirror, having a circular hole whose normal is equal to the axis of symmetry. It is, however, also possible to use two individual submirrors which would be adapted to be adjusted independently of each other. The concave mirror used is preferably a toroidal mirror.

A first entrance slit 14 and a second entrance slit 16, which allow passage of a first ray bundle and of a second ray bundle, are arranged in the opening, each of said entrance slits being arranged directly adjacent the inner edges of said first submirror 20 and of said second submirror 22. An optical construction (not shown in FIG. 1), which precedes each of the two entrance slits 14 and 16 and which may, for example, comprise light guides, is provided for the purpose of directing the first and second light ray bundles, which enter through the entrance slits 14 and 16, as divergent ray bundles onto the dispersion grating 12. The first entrance slit 14 and the second entrance slit 16 as well as the first incident ray bundle and the second incident ray bundle are respectively symmetrical with respect to each other relative to the optical axis 18. An angle of incidence of the light ray bundles on the dispersion grating 12 is additionally determined by the fact that the first entrance slit 14 and the second entrance slit 16 are laterally displaced with respect to the optical axis 18. As will be shown hereinbelow, the direction in which part of the respective incident ray bundles having a specific wavelength is diffracted in a predetermined order of diffraction by the reflection grating 12 is determined by the angle of incidence of the first and second ray bundles on the dispersion grating.

According to the optical path shown in FIG. 1, the light which comes from the first entrance slit 14 and which is reflected and diffracted at the dispersion grating 12, falls onto the lower submirror 22 where it is reflected and focussed whereby a sharp image of the entrance slit 14 is created in an image plane for each of the component ray bundles which have different wavelengths and which are spatially separated due to the dispersion of the granting. In an image plane located opposite the lower submirror 22, a first detector device 24 is provided. Differently coloured images 42, 43 and 44 of the entrance slit are produced on said detector device 24, said images 42, 43 and 44 being arranged in spaced relationship with one another along said detector device In addition, a white image 41 of the entrance slit 14 is formed on a non-sensitive area of said detector device, said white image being produced by the zeroth order, i.e. the specular reflection of the incident first light ray bundle at the dispersion grating 12 and, subsequently, at the lower submirror 22.

Likewise, the second light ray bundle, which emerges from the second entrance slit 16 and which falls divergently onto the grating 12 and is reflected and diffracted thereby, is imaged by the upper submirror 20 into an upper image plane whereby spatially separated images 32, 33 and 34 of the entrance slit are produced for different wavelengths. In this image plane of the second entrance slit, a second detector device 26 is provided. The two detector devices 24 and 26 are arranged such that they are symmetrical with respect to each other relative to the optical axis 18. In addition, the two detector devices 24 and 26 each extend at an angle relative to the incidence direction of the zeroth order which is imaged at points 41 and 31, respectively, of said first and second detector devices. The dual-beam polychromator preferably has a configuration of such a nature that two identical images are formed for the first and for the second ray bundle. This necessitates that all the respective distances and angles of tilt for the zero-order ray bundles are identical.

For achieving a high resolution, it is necessary to produce sharp images on the respective detector devices while avoiding image defects, such as coma and astigmatism, to a large extent. The two entrance slits and the two detector devices are therefore arranged in the dispersion plane; this is the plane (plane of paper) which extends at right angles to the grating spaces and in which the above-mentioned aberrations are minimal. Also the use of a toroidal mirror will reduce the image defects.

A suitable detector device would be a linear diode array, which responds to light in a wavelength region of approx. 200 nm to 1,000 nm. The diode array comprises, by way of example, a line of equidistant light-sensitive individual detectors producing an electrical read-out signal which is proportional to the incident light intensity at the respective position of the individual detector. It follows that, on the basis of the known spaced relationship of the detector elements in the line of diodes, a spatially resolved intensity profile can be measured. A line of diodes additionally offers the advantage that the individual detector elements in said line can be operated by very fast sequential reading out and that the read-out operation can thus be carried out within a particularly short period of time. Conventional lines of diodes comprising 512 individual diodes along a line length of 12.8 mm permit a typical resolution of 3 nm when the entrance slit width is 50 microns.

Instead of a diode array, it would also be imaginable to use a CCD array as a detector device. For special cases of use where a weak light intensity prevails in the image planes, it would also be possible to use a particularly light-sensitive vidicon array.

The arrangement of the entrance slits 14 and 16, which is shown in FIG. 1, has been chosen, relative to the dispersion grating 12, in such a way that the first ray bundle reflected at the dispersion grating 12 in the $+1^{st}$ order of diffraction and emerging from the entrance slit 14 will fall onto the lower submirror 22, whereas the $-1^{st}$ order of diffraction of the first ray bundle is reflected essentially in the direction of the opening in the concave mirror means, i.e. the wavelengths of the first ray bundle which are reflected in the $-1^{st}$ order of diffraction and with regard to which the detector devices 24 and 26 have detection sensitivity will leave the polychromator through the opening of the concave mirror means and will thus be prevented from contributing to the detector signal in the form of flare light or in the form of a false signal. The light of the second ray bundle emerging from the second slit 16 is, in a corresponding manner, reflected at the dispersion grating 12 in the $-1^{st}$ order of diffraction whereupon it will fall onto the upper submirror 20, whereas the $+1^{st}$ order of diffraction of the second ray bundle will be reflected in the direction of the opening of the concave mirror means, i.e. it will leave the polychromator. Crosstalk between the two channels will thus be avoided.

The optimization of the dual-beam polychromator for the purpose of achieving the diffraction behaviour which has been described hereinbefore and in the case of which the undesirable orders leave the polychromator through the opening in the concave mirror means, can essentially be derived from the grating equation. For a specific wavelength $\lambda$, the equation following hereinbelow applies with regard to the diffraction into the $m^{th}$ order of a reflection grating in which the component light ray bundles reflected by the respective reflecting grating lines of the reflection grating are constructively superimposed:

$$m\lambda = t\,(\sin\epsilon + \sin\Psi),$$

wherein t is the pitch of two neighbouring grating lines, $\epsilon$ is the angle of incidence and $\Psi$ is the angle enclosed by the ray bundle having the wavelength $\lambda$, which has been reflected into the $m^{th}$ order of diffraction, and by the surface normal of the grating. This equation is valid for the axial beam at the centre of the grating in general, i.e. it also valid for a concave grating.

As far as ray bundles which do not lie on the axis are concerned, this equation is valid for a parallel ray bundle falling onto a plane grating. However, this consideration is also applicable to a concave grating onto which a divergent incident ray bundle emanating from a point light source impinges, the radius of curvature of the concave grating corresponding essentially to twice the distance of said point light source from the surface of the grating. Such an arrangement corresponds to the mode of arrangement of a concave grating in the "Rowland circle".

When the entrance slit 14 is arranged in a suitable manner in relation to the optical axis 18 and the dispersion grating 12, a useful wavelength region of from approx. 200 nm to 800 nm is imaged via the lower submirror 22 on the detector device 24. In view of the fact that the detector device 24 is no longer sensitive to a wavelength region of approx. 1,000 nm and more, it will not impair an accurate measurement process when light which emerges from the entrance slit 14 and which has been diffracted in the wrong, i.e. in the $-1^{st}$ order of diffraction, falls onto the detector device 24 in a wavelength region of 1,000 nm and more. Hence, the arrangement of the polychromator 10 will have to be optimized in such a way that light with the wavelength 200 nm of the desired order of diffraction will impinge precisely on the inner edge of the submirror 22 and light with longer wavelengths in the desired $1^{st}$ order of diffraction will impinge on the adjacent areas of the lower submirror 22, whereas for the undesirable $-1^{st}$ order of diffraction of the light emerging from the entrance slit 14 only wavelengths from 1,000 nm and more will impinge on the upper submirror 20. A condition for designing and dimensioning the system is thus obtained, since the grating equation should for the first order and for a wavelength of 200 nm result in the same diffraction angle as for the $-1^{st}$ order of diffraction in the case of a wavelength of 1,000 nm. The following equation is thus obtained:

$$\Psi_{200} = \arcsin(2\times10^{-4}\times g + \sin\epsilon) = \Psi_{1,100} = \arcsin(1.1\times10^{-3}\times g - \sin\epsilon),$$

wherein $g = 1/t$ is the inverse grating constant.

From this a condition for $\epsilon$, i.e. the angle of incidence of the principal ray on the dispersion grating relative to the optical axis, is obtained.

The determination of the angle of incidence on the basis of the above-mentioned condition determines the lateral displacement of the first entrance slit 14 relative to the optical axis 18. The size of the opening in the reflecting concave mirror means is thus prescribed as well.

In view of the fact that, in the embodiment shown, the optical path for the second ray bundle entering through the second entrance slit 16 is to be symmetrical with respect to the first ray bundle, the condition for the position of the first entrance slit 14 will automatically also determine the position of the second entrance slit 16. The second ray bundle emerging from the second entrance slit 16 falls onto the grating 12 at an angle $-\epsilon$ relative to the optical axis 18 and is diffracted at an angle $-\Psi$ into the $+1^{st}$ order of diffraction. Due to the known symmetry of the sine function with $\sin(-\epsilon) = -\sin \epsilon$, the diffraction of the second ray bundle is therefore interpreted as diffraction into the $-1^{st}$ order according to the above diffraction rule.

In view of the non-constant linear dispersion of the grating, it will be advantageous when the angle of incidence $\epsilon$ on the grating is chosen slightly larger, e.g. enlarged by approx. 15%, than the angle calculated on the basis of the above condition.

As has already been described hereinbefore, the optimization of the angle of incidence of the first and second ray bundles on the grating 12 will guarantee that, for the first and second ray bundles, the non-desired order, which is complementary to the useful order, will leave the polychromator essentially through the opening in the concave mirror means whereby the generation of unwanted background signals on the respective associated detector devices 24 and 26 is prevented. In addition, it would, however, also be possible to limit by means of a filter the wavelength region arriving at the detector device. This would, by way of example, provide the possibility of removing from the light intensity reaching the detector device ray bundles of the unwanted incorrect order of diffraction in a boundary wavelength region, which coincide with ray bundles of the desired useful order of diffraction having an essentially shorter wavelength. A suitable filter would be a band filter (glass filter), which is attached to the detector elements from 600 nm onwards and which permits passage of an overall wavelength region of 200 to 800 nm.

In addition to the desired useful order of diffraction, i.e. the $+1^{st}$ order of diffraction for the first ray bundle emerging from the entrance slit 14, and the order of diffraction complementary thereto, i.e. the $-1^{st}$ order, higher and lower orders occur as well. The zeroth order reflected by the grating 12 in accordance with the known conventional laws of reflection will be focussed at positions 41 and 31 on the respective detector devices 24 and 26 for the first and second ray bundles. The sharp image of the respective entrance slit in zeroth order on the detector device is, however, spatially separated from the polychromatic image in the desired useful order of diffraction so that no unwanted superimposition effects will be produced, since the zeroth order falls on a non-sensitive area.

Figure 2:
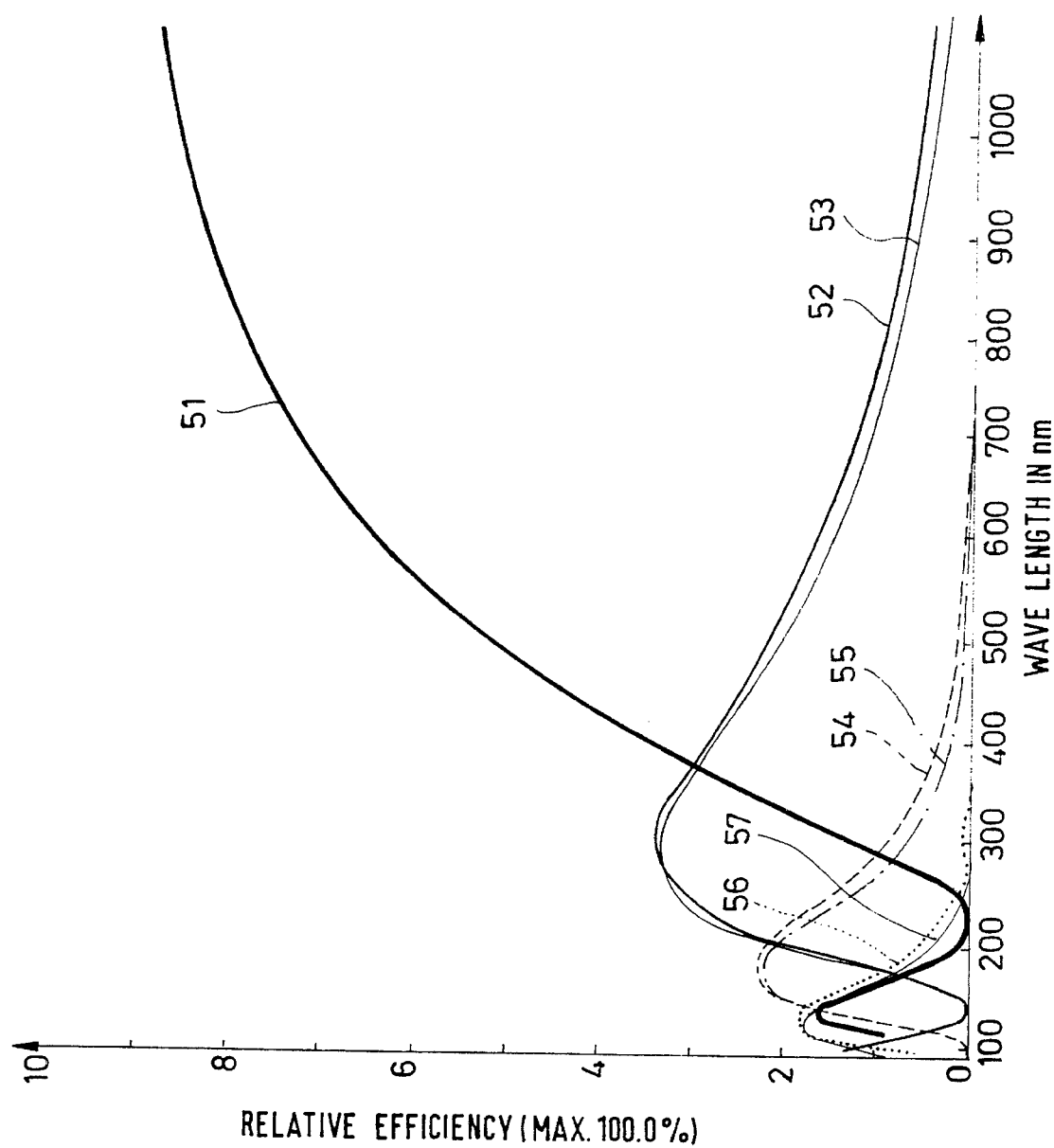
FIG. 2 shows a graphic representation of the order of diffraction as a function of the wavelengths of the individual orders of diffraction for a typical reflection grating with sine profile.

FIG. 2 shows the diffraction efficiency as a function of the wavelength for various orders of diffraction when the diffraction takes place at a grating having a $\sin^2$ profile. The reflection grating used as a basis for the calculation has a grating constant of 600 lines per millimeter, the amplitude of the spaces being 88 nm. The angle of incidence of the incident polychromatic ray bundle is 10°. Curve 51 represents the relative diffraction efficiency as a function of the wavelength in the zeroth order of diffraction. Curves 52 and 53 each represent the wavelength-dependent relative diffraction efficiency for the $+1^{st}$ and $-1^{st}$ orders of diffraction. Curves 54 and 55 each represent the wavelength dependent diffraction efficiency for the $+2.^{nd}$ and $-2.^{nd}$ orders. Curves 56 and 57 each represent the wavelength-dependent relative diffraction efficiency for the $+3^{rd}$ and $-3^{rd}$ orders of diffraction. The efficiencies for higher orders of diffraction are negligibly small, and, consequently, they are not shown in the graphic representation. FIG. 2 shows that, in addition to the zeroth order which does not cause any unwanted superimposition due to the spatial separation on the respective detector devices, also the respective $+1^{st}$ and $-1^{st}$ and $+2^{nd}$ and $-2^{nd}$ orders have a considerable intensity in the useful wavelength region of 200 to 800 nm, whereas the $+3^{rd}$ and $-3^{rd}$ orders of diffraction only have a relative diffraction efficiency of approx. 0.5% for a wavelength of 200 nm, said diffraction efficiency being almost reduced to 0% for a wavelength of 300 nm.

According to curves 54 and 55, the $+2^{nd}$ and $-2^{nd}$ orders of diffraction have a relative efficiency of approx. 2% to 0.5% in a wavelength region of 200 to 500 nm. In view of the fact that, for a predetermined angle of incidence, the $+2^{nd}$ order of diffraction having a given wavelength is diffracted in the same direction as the $+1^{st}$ order of diffraction having a wavelength which is twice as long, the wavelength region of 200 to 500 nm of the $+2^{nd}$ order of diffraction will superimpose the wavelength region of 400 to 1,000 nm of the $+1^{st}$ order of diffraction. This will have the effect that light having a specific wavelength and belonging to the first order of diffraction and an additional small amount of light having half the wavelength and belonging to the second order of diffraction will fall onto a specific point of the detector device, e.g. an element of a line of diodes.

Figure 3:
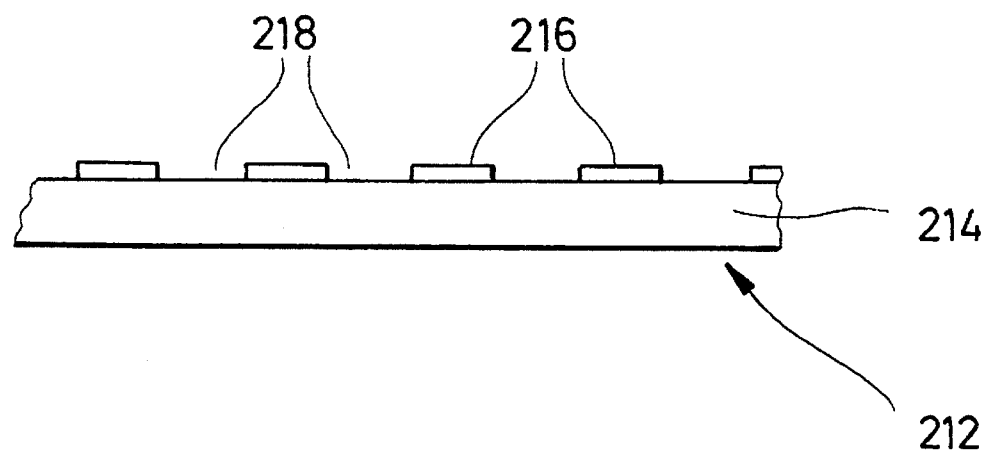
FIG. 3 shows a cross-section at right angles to the direction of the spaces of a laminary grating.

Such a superimposition of light of different wavelengths belonging to different orders of diffraction is normally not desired. A possible remedy is the provision of a suitable surface structure of the grating by means of which the desired orders of diffraction are preferred and the undesired orders of diffraction are suppressed. In FIG. 3, a laminary grating 212 is shown in a cross-sectional view; in the case of this laminary grating, the higher even-numbered orders of diffraction are suppressed. The laminary grating 212, which, for the sake of simplicity, is shown as a plane grating in FIG. 3, comprises reflecting bars 216 which are attached to a substrate 214. The bars 216, which have an essentially rectangular cross-section, have the same width as non-reflecting grating spaces 218 which are located between said bars 216. It follows that the width of the bars 216 and of the grating spaces 218, respectively, corresponds precisely to half the grating constant.

FIG. 4 shows a representation of the relative diffraction efficiency as a function of the wavelength for various orders of diffraction of a laminary grating shown in FIG. 3. The laminary grating used as a basis for the calculation has a grating space density of 600 lines per millimeter, the profile depth being 75 nm. The width of the reflecting rectangular bars corresponds to the width of the grating spaces extending between said bars. Curve 61 in FIG. 4 represents the wavelength-dependent relative diffraction efficiency of the zeroth order of diffraction. Curves 62 and 63 each represent the relative diffraction efficiency of the $+1^{st}$ and $-1^{st}$ orders of diffraction. Curves 66 and 67 each represent the relative diffraction efficiency of the $+3^{rd}$ and $-3^{rd}$ orders. The diffraction efficiency for the $+2^{nd}$ and $-2^{nd}$ orders of diffraction is 0% throughout the whole wavelength region shown and is, consequently, not shown in FIG. 4. It can thus be inferred from FIG. 4 that the second order of diffraction is essentially suppressed completely so that any unwanted superimposition with light ray bundles having twice the wavelength and belonging to the first order of diffraction will be prevented. Only the third order of diffraction having a relative efficiency of 0.1 to 0.5% in a wavelength region of 200 to approx. 1500 nm can contribute to a superimposition in a wavelength region of 600 to 1,500 nm of the first order of diffraction.

Figure 5:
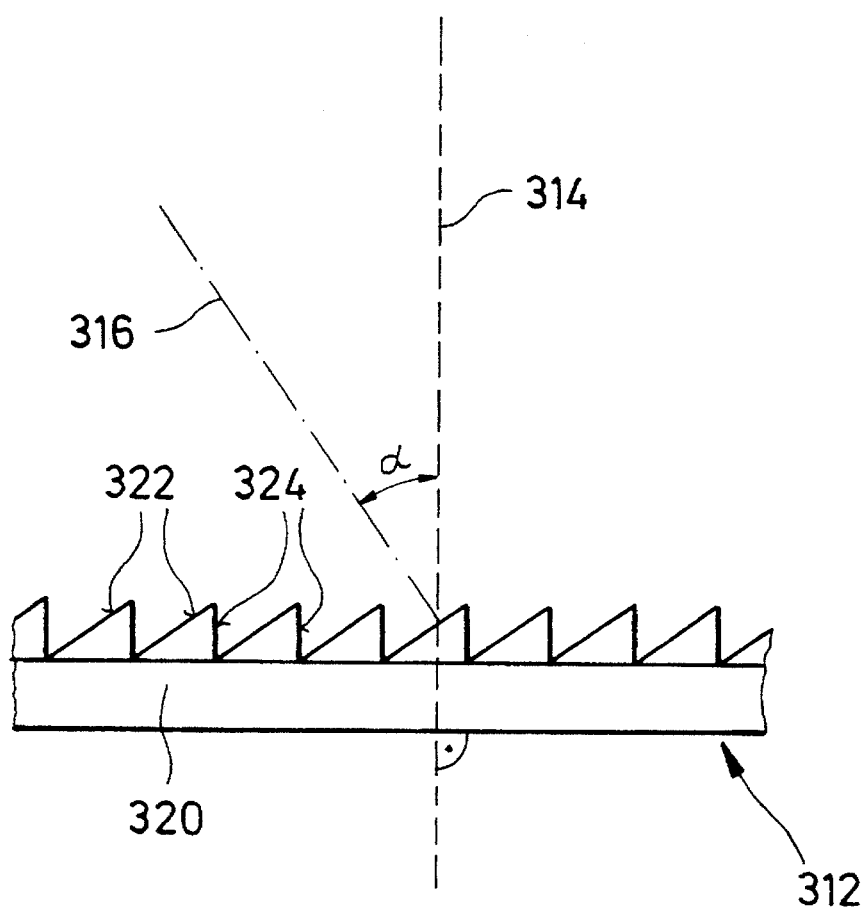
FIG. 5 shows a cross-section at right angles to the direction of the grating grooves of a blazed grating.

An additional possibility of eliminating superimposition effects of ray bundles having different wavelengths and belonging to different orders of diffraction is offered by the blazed reflection grating 312, which is shown in FIG. 5. The reflection grating 312, which, for the sake of simplicity, is again formed on a plane substrate 320, has grooves representing a sawtooth profile when seen in a cross-sectional view. Each grating groove has a main reflection surface 322 whose surface normal 316 encloses a so-called blaze angle α with the surface normal 14 of the underlying substrate 320. In addition, each grating groove comprises a second surface 324 which is located adjacent said main reflection surface 322. By means of such a grating 312 with a blaze, in the case of which a light ray bundle diffracted in a specific order of diffraction fulfills, for one wavelength, additionally the condition for the normal specular reflection at the main reflection surface 322, the diffraction efficiency for a specific diffraction order, e.g. in the specimen channel, can be increased to the disadvantage of another channel, e.g. the reference channel. This offers, on the one hand, the possibility of overcoming the above-mentioned problem of a superimposition of different wavelengths belonging to different orders of diffraction, and, on the other hand, it offers the possibility of preferring e.g. the specimen ray bundle, which has been attenuated while passing through an absorption cell, in comparison with the reference ray bundle so that the reference ray bundle and the specimen ray bundle will then both be detected with comparable intensities by the two detector devices. An improvement of the polychromator with regard to noise is thus achieved.

Whereas the embodiment of the polychromator described hereinbefore is an embodiment in the case of which the $+1^{st}$ order of diffraction has been used as a useful order of diffraction for the specimen ray bundle and the $-1^{st}$ order of diffraction has been used as a useful order of diffraction for the reference ray bundle, it would also be possible to employ, especially in cases in which a grating with a blaze is used, a different order of diffraction as useful order of diffraction, e.g. the $+2^{nd}$ order of diffraction for the specimen ray bundle.

The dual-beam grating polychromator according to the present invention is particularly suitable for use with the conventional test cells in the field of liquid chromatography, since the aperture ratio of the specimen ray bundle, which impinges divergently on the dispersion grating, can be adapted very well to the test cells or to the numerical aperture of optical waveguides. Such a polychromator is also adapted to be used for monitoring a continuous process.

The polychromator can be provided with an encapsulated housing with good thermal insulation so as to exclude to a large extent thermal effects caused by changes in the ambient temperature.

I claim:

1. A dual-beam polychromator comprising a reflecting dispersion grating (12), a first entrance slit (14) for a first ray bundle, a second entrance slit (16) for a second ray bundle and first and second detector devices (24, 26) respectively used for simultaneously detecting the spectra of the first and second ray bundles diffracted at the dispersion grating, characterized in that a concave mirror means provided with an opening is located opposite the dispersion grating (12), said concave mirror means serving to focus the ray bundles, which have been diffracted at the dispersion grating, onto said first and second detector devices, and that each of the ray bundles coming from the first and second entrance slits being directed through said opening onto the grating.

2. A dual-beam polychromator according to claim 1, characterized in that the dispersion grating (12) is a concave grating and that each of said first and second light ray bundles fall divergently onto said concave grating.

3. A dual-beam polychromator according to claim 1 or 2, characterized in that the first and second entrance slits are arranged relative to the dispersion grating in such a way that the positive or the negative first order of diffraction of the first ray bundle and the respective inverse first order of diffraction of the second ray bundle fall onto the first and second detector devices and that respective other first orders of the first and second ray bundles essentially leave the polychromator through the opening.

4. A dual-beam polychromator according to claim 1, characterized in that the first and second entrance slits and the first and second detector devices are located in a dispersion plane extending at right angles to the direction of the grating spaces.

5. A dual-beam polychromator according to claim 1, characterized in that the optical arrangement of the polychromator is essentially symmetrical with respect to an optical axis (18) traversing the dispersion grating (12) at right angles.

6. A dual-beam polychromator according to claim 1, characterized in that the dispersion grating (212) is a laminary grating which comprises reflecting bars (216) having an essentially rectangular cross-section and grating spaces (218) of identical width.

7. A dual-beam polychromator according to claim 1, characterized in that the dispersion grating (312) has a grating blaze for amplifying a desired order of diffraction.

8. A dual-beam polychromator according to claim 1, characterized in that the dispersion grating is a holographic grating.

9. A dual-beam polychromator according to claim 1, characterized in that the first and second detector devices (24, 26) are each arranged at an angle to the zeroth order ray bundles of the first and second ray bundles.

10. A dual-beam polychromator according to claim 1, characterized in that the first and second detector devices (24, 26) comprise first and second diode arrays.

11. A dual-beam polychromator according to claim 10, characterized in that each of said first and second diode arrays shows an identical thermal and electrooptical behaviour.

12. A dual-beam polychromator according to claim 1, characterized in that a thermally insulating encapsulation is provided.

13. A dual-beam polychromator according to claim 1, characterized in that first and second filters which permit only a specific wavelength region to pass are provided in front of said first and second detector devices.

14. A dual-beam polychromator according to claim 13, characterized in that said first and second filters include glass filters which are arranged above the detector device so that a wavelength region of 200 to 800 nm is transmitted and adjacent wavelength regions are blocked.

* * * * *